May 23, 1939.  A. A. WOOD  2,159,925

SALES AND SERVICE EQUIPMENT

Filed Sept. 18, 1937   3 Sheets-Sheet 1

Inventor
A. A. Wood,
Seymour, Bright & Nottingham
Attorneys

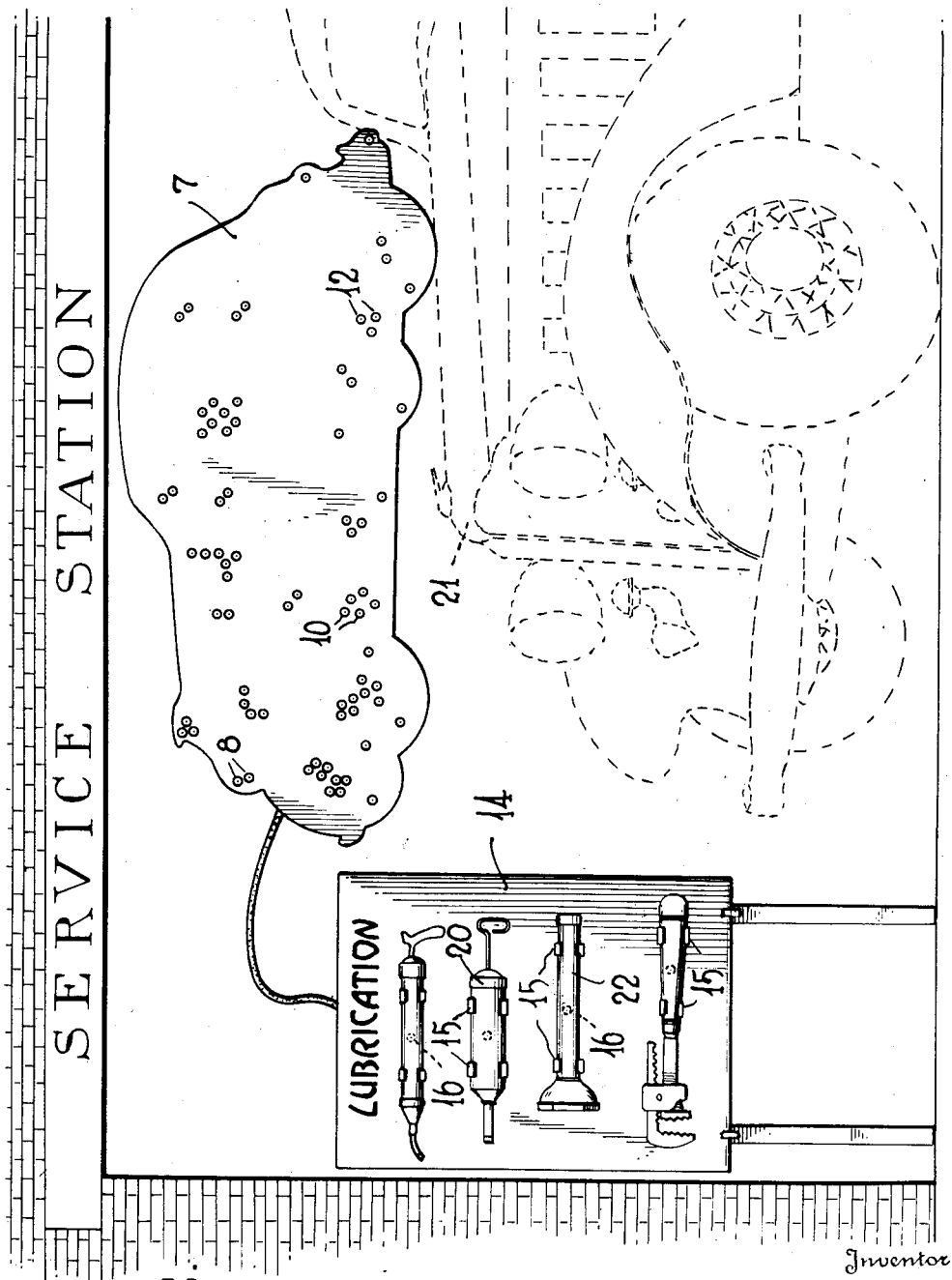

May 23, 1939.  A. A. WOOD  2,159,925
SALES AND SERVICE EQUIPMENT
Filed Sept. 18, 1937  3 Sheets-Sheet 3
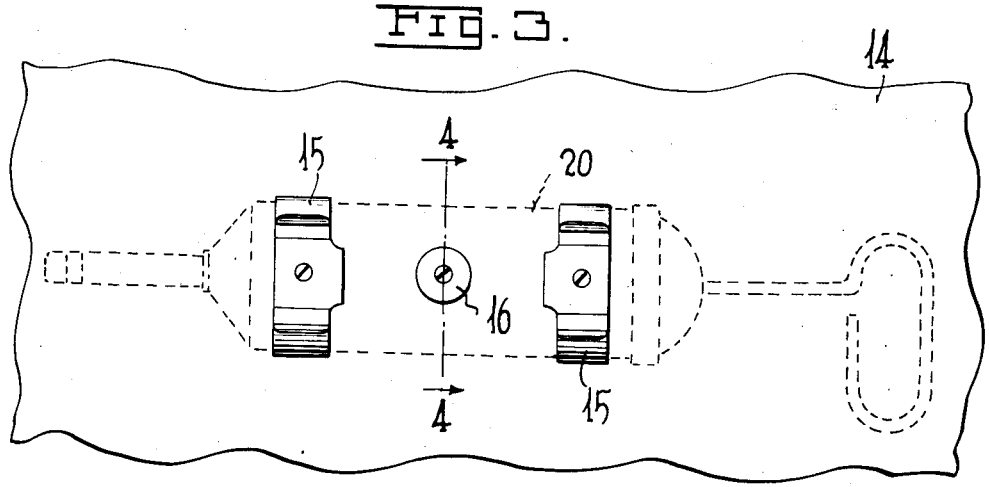
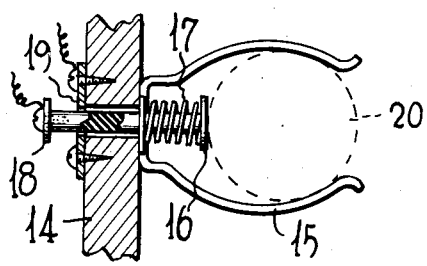
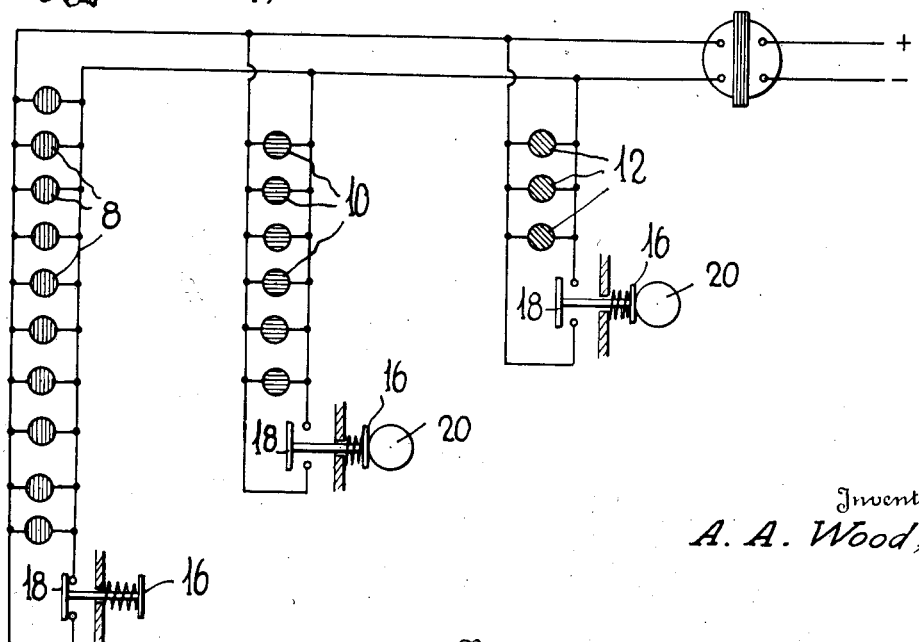
Inventor
A. A. Wood,
By Seymour, Bright & Nottingham
Attorneys Patented May 23, 1939

2,159,925

UNITED STATES PATENT OFFICE 2,159,925

SALES AND SERVICE EQUIPMENT

Albert A. Wood, Columbus, Ohio, assignor of one-half to Ernest A. Holton, Columbus, Ohio Application September 18, 1937, Serial No. 164,598

4 Claims. (Cl. 35—54)

This invention relates to sales or service equipment and more particularly to a mechanical sales instrument designed to improve the sale of services connected with any article, for example, an automobile. My improved sales device or system has been designed especially to enable automobile service salesmen to demonstrate to an automobile owner of what a complete lubrication or other service consists. By using my equipment, a service salesman can control lights placed in various spots on a board containing the figure of an automobile, and in this way the salesman can indicate the location of each point of lubrication, inspection or other service; explain how each point is serviced, and the type of lubricant to be used. The electric light bulbs are arranged on the board at points corresponding to points on the actual automobile.

My improved sales arrangement enables the owner of an automobile to watch a mechanic while his automobile is being serviced so that he can check on the work of the mechanic.

My new system also permits the superintendent of a service station to check on individual mechanics to make sure that the mechanic properly inspects or services an automobile.

In accordance with the invention tools or the like, which a mechanic must use in servicing an automobile, may be employed to control the switches governing the lights on the board whereby when a tool is removed from the rack, the superintendent of the service station or the owner of the automobile may be apprised of the points on the automobile where that particular tool is to be used so that he can check on the mechanic and insure the use of proper lubricants or the like.

The invention will now be described in connection with the accompanying drawings, in which Fig. 1 is a side elevation of a board having a diagrammatic representation of an automobile thereon and bearing protruding electric lamp bulbs of various colors, and also having legends adjacent to the lamps to describe what each individual lamp represents on the automobile with which the board or chart is used.

Fig. 2 shows such a board hooked up with a rack containing grease guns or tools to be used in connection with an automobile which the figure of the automobile represents.

Fig. 3 is an enlarged elevation of a portion of the rack showing one of the individual switches controlled by a grease gun.

Fig. 4 is a sectional view taken on the line 4—4 of Fig. 3.

Fig. 5 is a diagrammatic view illustrating the manner in which the groups of lamps are controlled.

Figure 1:
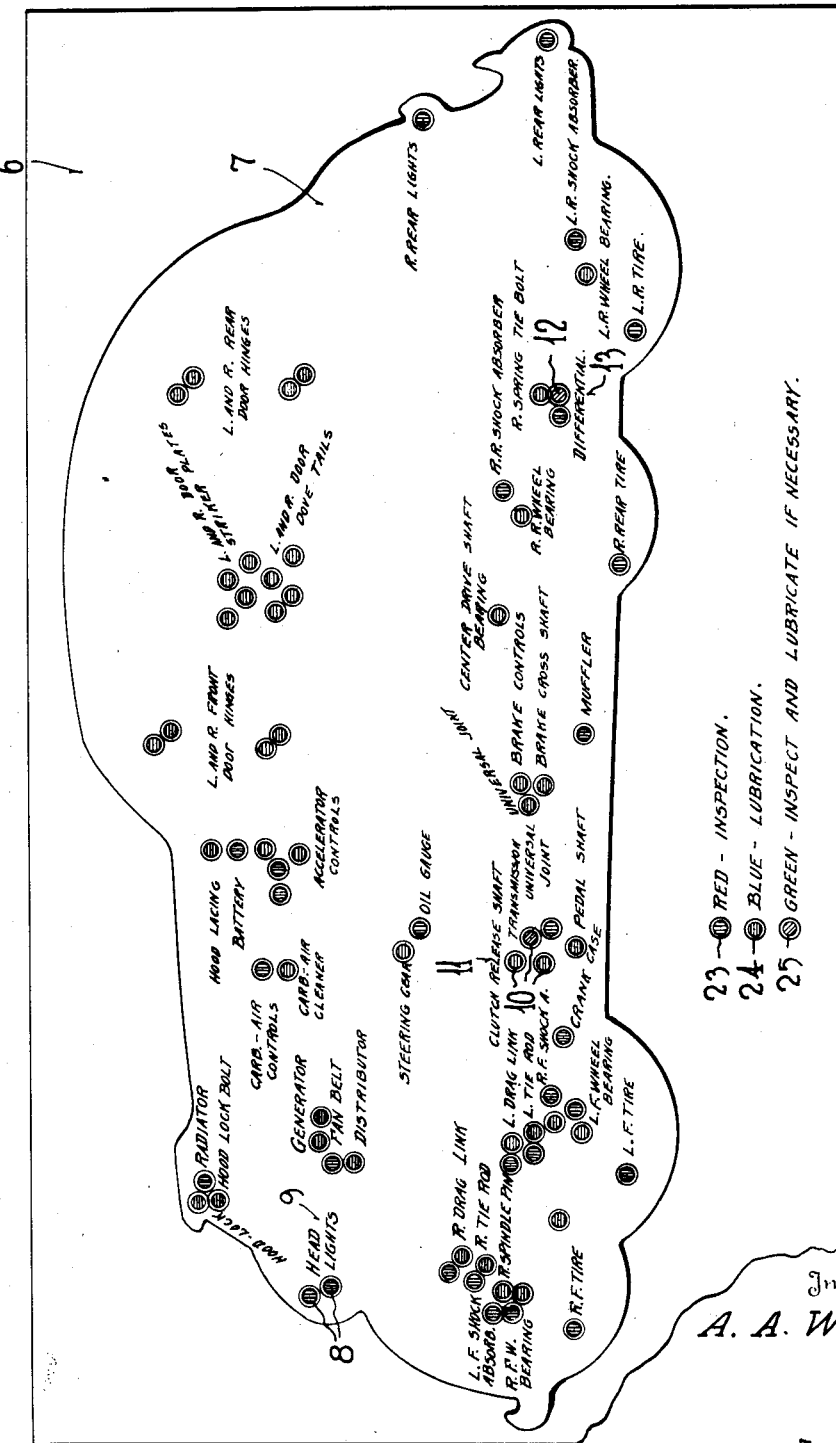

According to the invention (Fig. 1), a selling message (the legends on the diagrammatic representation of an article) is printed either on or adjacent to the face of the board. The complete selling message is broken down into individual selling groups, and each group is broken down into selling statements. In actual practice each group is in numerical order in accordance to the sequence of the selling message, and associated with the complete selling message is a diagram or picture of the article described in the selling message. All selling points as listed in the sales group are illustrated on the diagram or picture with miniature electric lamps, which are controlled by switches operated in any desired way. Attached to the diagram or picture are individual parts in the manufacture and service of the article, and these individual parts are indicated by the electrical lamps which are controlled in any desired way.

Referring to the drawings, 6 designates a board or chart bearing the diagrammatic representation 7 of an automobile. The board is provided with a series of red lamps 8, and adjacent to such lamps or associated with them are legends 9 to describe what the lighting of a particular lamp designates.

The chart is also provided with a number of blue bulbs 10 also associated with legends 11 to indicate what the lighting of a particular blue bulb represents.

Green bulbs 12 are also arranged on the board and they are associated with indicating legends 13.

All of the bulbs are preferably mounted in sockets supported by the board, so that all bulbs will project forwardly from the face of the board to illuminate the legends.

As best shown in Fig. 5, all lamps indicating a particular service will be controlled by a specific switch. For example, if the lamps of the automobile are to be inspected, a number of lights on the board will be illuminated when a particular switch is actuated, and in accordance with my invention, all of these lights will be thrown on when a corresponding tool is removed from the rack shown in Fig. 2. This rack may be of any preferred form and may consist of a board 14 carrying a number of spring clasps 15 for use in holding grease guns, a flash light, a wrench or the like; and as illustrated in Figs. 3 and 4, wherever one of these clasps supports is arranged, there is a plunger 16 to be actuated by the grease gun or the like supported by a particular clasp support. The plunger is forced forwardly of the board 14 by a spring 17, and when it is moved forwardly at the time a grease gun or the like is removed from the board, contacts 18 and 19 at the rear of the board 14 will come into engagement to close a particular circuit in which certain lights of the board are arranged. By way of example, it will be assumed that the three blue lamps 12, in Fig. 5, are in a circuit controlled by a switch that is actuated by a grease gun 20 containing the proper grease to use on universal joints. When that gun is removed from the rack the circuit of those particular lamps on the board 12 will be closed and the three lamps on such board will be illuminated to indicate where the gun is to be employed on the automobile 21 shown in Fig. 2.

Again let us assume that certain parts of the automobile are to be inspected, then if the flash light 22 shown in Fig. 2 is removed from the rack, corresponding lights on the chart 6 will be illuminated so that the mechanic should inspect those points on the automobile.

From the above it is believed the construction and use of the invention may be readily understood by those skilled in the art, but I desire to point out that the system is not confined to use with automobile service. It may be employed with any article that is represented on the board 6 and which is to be serviced or sold.

For further informative purposes, the board 6 may be provided with additional lamps 23, 24 and 25 that are arranged on the board 6 adjacent to the Figure 7 of the automobile. The lamp 23 may be red and will indicate an inspection job. The lamp 24 may be blue and indicate a lubricating job, while the lamp 25 may be green and indicate that the automobile is to be inspected and lubricated if necessary. In this way an observer will note that whenever any red lamp is illuminated, this is for inspection purposes only while if a blue lamp is on, it is for lubrication purposes, and so on.

While I have disclosed what I now consider to be a preferred embodiment of the invention in such manner that the same may be readily understood by those skilled in the art, I am aware that various changes may be made in the details disclosed without departing from the spirit of the invention as expressed in the claims.

What I claim and desire to secure by Letters Patent is:

1. In combination, a panel bearing a diagrammatic representation of a particular kind of article, electric lamp bulbs mounted on the panel and arranged according to the arrangement of specific parts of the article which the diagram represents, legends associated with the lamps and bearing the names of the parts of the article which are to be serviced, means for supporting tools used in servicing the article, switches actuated by the removal of the tools from said means or the returning of the tools to said means, and electric circuits in which the switches and lamps are arranged in such manner that the removal of a tool from the means will result in illuminating lamps, which indicate particular parts on the diagrammatic representation with which the tool is to be used.

2. In equipment of the character described, a panel bearing a diagrammatic representation of a particular article that is to be serviced, electric lamp bulbs mounted on the panel at points corresponding with the specific parts of the actual article, legends associated with the lamps and giving the names of such parts, electric circuits in which certain of the lamps are grouped, means for supporting tools to be employed in servicing the parts indicated by the last mentioned lamps, and control switches for said circuits actuated by the removal or replacement of said tools.

3. In equipment of the character described, a panel bearing a diagrammatic representation of a particular article that is to be serviced, groups of electric lamp bulbs mounted on the panel at points corresponding with the specific parts of the actual article, the lamps of each group being of a color different from those of the other groups, legends associated with the lamp bulbs and giving the names of such parts, electric circuits, each group of lamps being arranged in one of said circuits, means for supporting tools to be employed in servicing the parts indicated by the last-mentioned lamps, and control switches for said circuits actuated by the removal or replacement of said tools.

4. In combination, a panel bearing a diagrammatic representation of an automobile, electric lamp bulbs mounted on the panel and arranged according to the arrangement of specific parts of the automobile which the diagram represents, a legend associated with each lamp and bearing the name of the part of the automobile which that lamp indicates and which is to be serviced, means for supporting tools used in servicing the automobile, switches actuated by the removal of the tools from said means or the returning of the tools to said means, and electric circuits in which the switches and lamps are arranged in such manner that the removal of a tool from the supporting means will result in illuminating lamps which indicate particular parts on the diagrammatic representation with which the tool is to be used.

ALBERT A. WOOD.